United States Patent [19]

Ushikubo

[11] Patent Number: 5,793,359
[45] Date of Patent: Aug. 11, 1998

[54] SYSTEM FOR RF COMMUNICATION BETWEEN A COMPUTER AND A REMOTE WIRELESS DATA INPUT DEVICE

[75] Inventor: Yasumi Ushikubo, Tokyo, Japan

[73] Assignee: Mitsumi Electric Co., Ltd., Tokyo, Japan

[21] Appl. No.: 691,008

[22] Filed: Aug. 5, 1996

[30] Foreign Application Priority Data

Aug. 25, 1995 [JP] Japan ................................. 7-217964

[51] Int. Cl.$^6$ ................................................ G06F 3/033
[52] U.S. Cl. ................................................ 345/169
[58] Field of Search ............................ 345/156, 168, 345/169; 348/734; 364/189; 341/22, 31, 176

[56] References Cited

U.S. PATENT DOCUMENTS

| | | |
|---|---|---|
| 4,754,268 | 6/1988 | Mori ............................ 345/168 |
| 4,988,981 | 1/1991 | Zimmerman et al. ............ 345/156 |
| 5,049,863 | 9/1991 | Oka ............................ 345/168 |
| 5,297,061 | 3/1994 | Dementhon et al. ............ 345/156 |
| 5,307,297 | 4/1994 | Iguchi et al. ............... 345/169 |
| 5,420,607 | 5/1995 | Miller et al. ............... 345/156 |
| 5,440,502 | 8/1995 | Register ...................... 345/168 |
| 5,526,023 | 6/1996 | Sugimoto et al. .............. 345/156 |

*Primary Examiner*—Mark R. Powell
*Attorney, Agent, or Firm*—Frohwitter Patent- und Rechtsanwälte

[57] ABSTRACT

A wireless data input device requiring no cable for connection to the keyboard or to the pointing device. A wireless keyboard 16 incorporating a pointing device has a data encoder 21 and an RF transmitter 22, and transmits the key data and the pointing cursor data to the reception unit 3 which is connected to a keyboard connector 6 and to a mouse connector 7 of a computer 1 through connection cables 8 and 9. The reception unit 3 has a data decoder 11 and an input/output control unit 12, and decodes the received data and inputs them to the computer through bidirectional communication.

1 Claim, 2 Drawing Sheets

1

SYSTEM FOR RF COMMUNICATION BETWEEN A COMPUTER AND A REMOTE WIRELESS DATA INPUT DEVICE

BACKGROUND OF THE INVENTION

The present invention relates to a data input device such as a keyboard for inputting data to a personal computer and, particularly, to a wireless data input device.

DESCRIPTION OF THE PRIOR ART

A personal computer system comprises a computer, a keyboard and a display such as CRT, and, generally, uses a pointing device such as mouse or the like. The keyboard is connected to the computer through a connection cable, and the pointing device is connected to the computer or to the keyboard through a connection cable.

The keyboard and the printing device connected to the computer through cables are limited for their places of arrangement by the connection cables. Besides, the connection cables often become obstacles. Therefore, wireless communication between the keyboard and the computer has been proposed by utilizing electromagnetic waves or infrared rays. However, provision of transmission/reception functions for executing bidirectional communications between the pointing device or the like and the computer makes the circuit constitution and the communication control complex and, further, drives up the cost.

That is, there exists technical problems that must be solved when it is attempted to provide a simply constructed data input device such as a wireless keyboard or a wireless pointing device. The object of the present invention is to solve the above-mentioned technical problems.

SUMMARY OF THE INVENTION

In order to accomplish the above-mentioned object, the present invention provides a wireless data input device comprising:

a wireless data transmission unit having an alphanumeric keyboard or a command keyboard, a pointing device, an encoder for converting key data and mouse cursor control data into RF communication data, and an RF transmitter; and a reception unit having an RF receiver, a decoder for decoding the RF communication data, and an input/output control unit, the reception unit being connected, through connection cables, to a keyboard connector and to a pointing device connector of a computer.

The wireless data transmission unit effects unidirectional communication with the reception unit which inputs data to the computer by effecting bidirectional communication with the computer.

DESCRIPTION OF THE PREFERRED EMBODIMENT

Figure 1A:
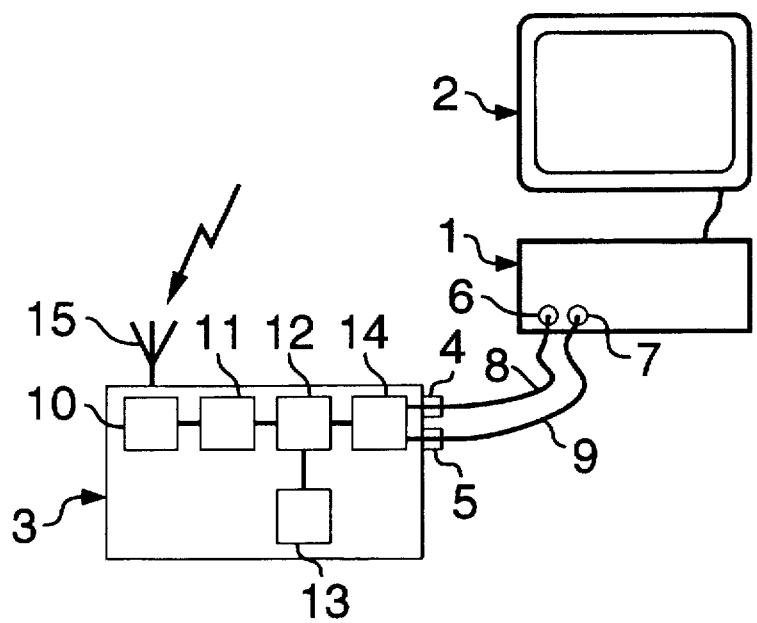
FIG. 1 is a diagram illustrating the constitution of a computer system by using a wireless data input device of the present invention.
Figure 1B:
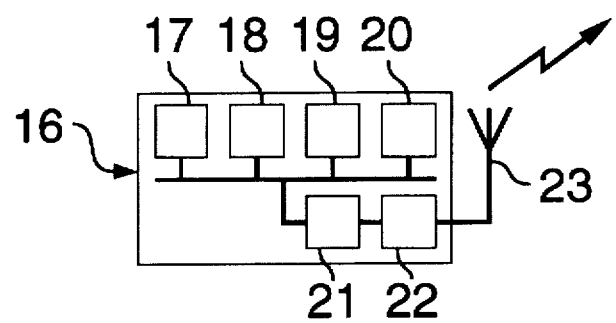
Figure 1C:
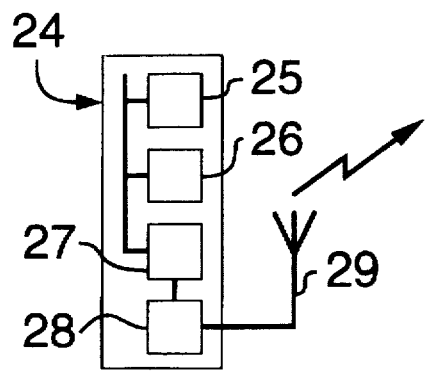

An embodiment of the invention will now be described with reference to the drawings. FIG. 1 illustrates the constitution of a personal computer system using a wireless data input device of the present invention, wherein reference numeral 1 denotes a personal computer, and 2 denotes a CRT display. A reception unit 3 of the wireless data input device is equipped with a keyboard output connector 4 and a mouse output connector 5 which are connected to a keyboard connector 6 and to a mouse connector 7 of the personal computer 1 through connection cables 8 and 9.

The reception unit 3 includes an RF receiver 10, a data decoder 11, an input/output control unit 12, a CPU 13, and a communication interface 14. Electromagnetic waves received by an RF antenna 15 are decoded into a form that meets the input data form of the personal computer 1, and bidirectional communication is carried out with respect to the personal computer 1 thorough the communication interface 14.

Figure 2:
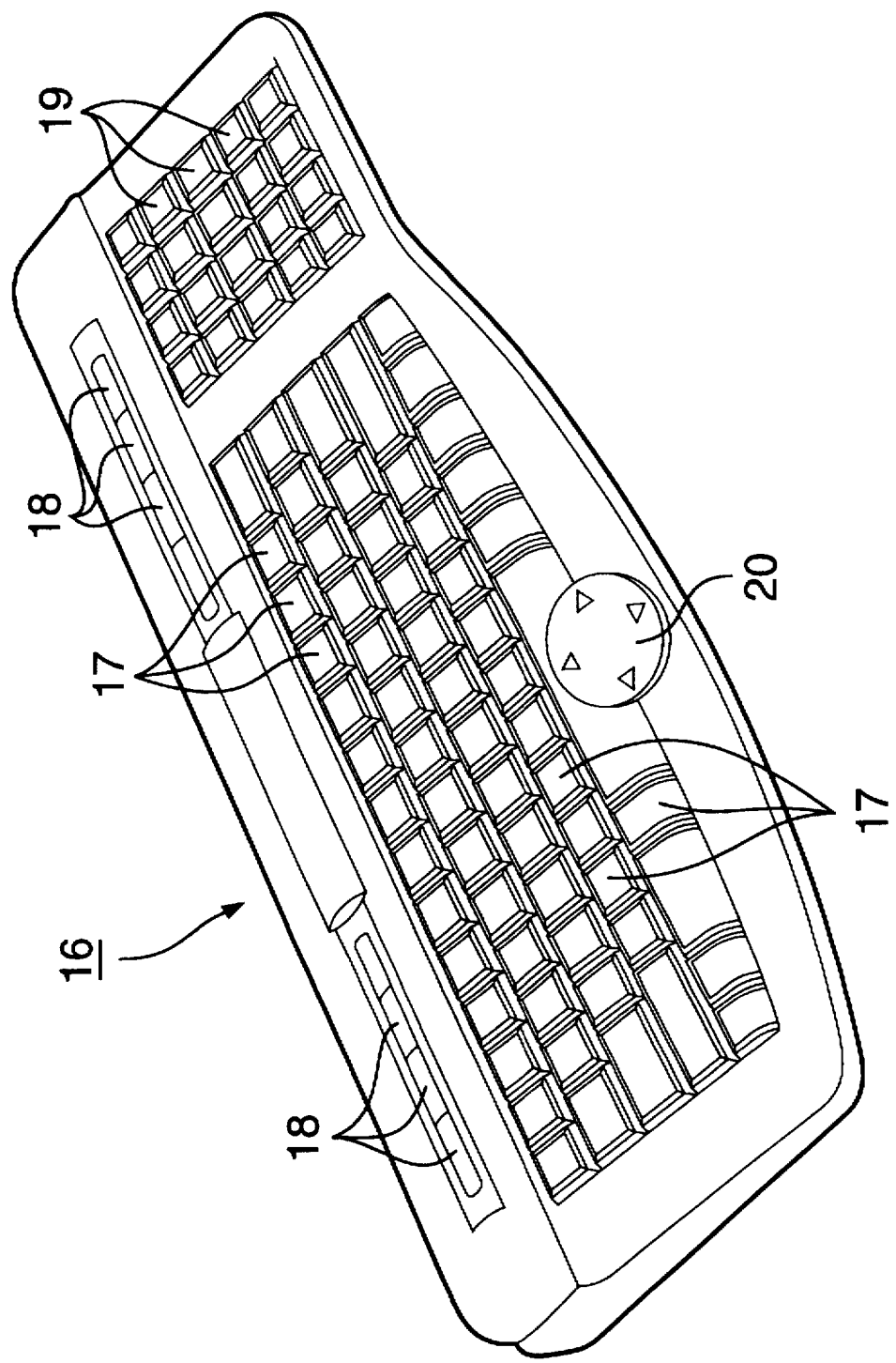
FIG. 2 is a perspective view of a wireless keyboard.

Referring to FIG. 2, a wireless keyboard 16 has, like a general keyboard, alphanumeric keys 17, function keys 18 and ten keys 19, and further has a pointing device 20 arranged at a central position on the front portion thereof. As shown in FIG. 1, the housing incorporates a data encoder 21, an RF transmitter 22, and an RF antenna 23. The output data generated by manipulating the keys 17, 18, 19 and the pointing device 20 are converted through the data encoder 21 into serial data adapted to communication with the reception unit 3, and are transmitted through the RF transmitter 22.

The input/output control unit 12 of the reception unit 3 executes bidirectional communication such as request for interrupt and request for transfer with the personal computer 1 through the communication interface 14. Key data, mouse cursor data and the like data are input to the computer 1 like those of the keyboard that is connected through a cable.

A wireless remote controller 24 which is another wireless data transmission unit shown in FIG. 1 is equipped with a variety of command keys 25 such as volumes and channels of other television sets and AV devices controlled through the CRT display 2 or the computer 1, a pointing device 26, a data encoder 27, an RF transmitter 28, and an RF antenna 29. With the control programs of various devices being introduced into the personal computer 1, it is made possible to click an icon on the CRT display 2 by manipulating the pointing device 26, to select a desired device or to display an operation menu, so that the operation is carried out in an interactive manner.

The present invention is in no way limited to the above-mentioned embodiment only but the constitution of the transmission unit and the reception unit can be modified in a variety of ways within the technical scope of the invention, and the present invention encompasses such modified constitutions as a matter of course.

According to the wireless data input device of the present invention as described above, the key input device and the pointing device are liberated from the connection cables eliminating limitation in regard to place for installation and moving. Besides, the keyboard and the reception unit 3 execute the input/output control through the unidirectional communication, and the reception unit and the computer execute the input/output control through the bidirectional communication, offering such advantages that the communication control is simple between the transmitter and the reception unit, and the wireless system is constituted at a low cost.

I claim:

1. A system for RF communication between a computer and a remote wireless data input device comprising:

a wireless data transmission unit having an alphanumeric keyboard or a command keyboard, a pointing device, an encoder for converting alphanumeric or command key data and pointing device control data into RF signal communication data, and an RF signal transmitter; and a reception unit remote to the computer having an RF signal receiver, a decoder for decoding said RF signal communication data, and an input/output control unit, wherein said reception unit is connected through connection cables to both a keyboard connector and a pointing device connector of a computer.

* * * * *